United States Patent Office

3,522,178
Patented July 28, 1970

3,522,178
GREASE COMPOSITIONS
Norman Duffield Peschko, Haddonfield, N.J., and Burton Peter Block, Wayne, Gerd Helmut Dahl, King of Prussia, and Luke R. Ocone, Philadelphia, Pa., assignors to Pennwalt Corporation, a corporation of Pennsylvania
No Drawing. Filed Jan. 5, 1968, Ser. No. 695,888
Int. Cl. C10m 5/24, 7/44, 7/46
U.S. Cl. 252—32.5    16 Claims

ABSTRACT OF THE DISCLOSURE

Grease compositions comprising a liquid lubricant thickened with an inorganic polymer consisting of a triply bridged chromium atom where said bridging groups are the anions of phosphinic acids of structure $R_2P(X)XH$ where R is selected from the group consisting of alkyl and aryl and X is oxygen or sulfur.

---

It is known to add inorganic polymers to various lubricating liquids to obtain grease compositions. For example, U.S. Pat. 3,332,873 teaches that greases are made from phosphate esters by the addition of certain doubly bridged inorganic polymers coordinated with two unidentate ligands. Also, U.S. 3,331,774 shows how a diester liquid is converted to a grease by the addition of similar inorganic copolymers having an intrinsic viscosity below about 1.0 consisting of doubly bridged chromium atoms coordinated with a hydroxyl group and a water molecule, wherein the bridging groups are derived from certain phosphinic acids. Silicone fluids are also converted to greases in accordance with the disclosure U.S. 3,331,775 by adding a relatively low molecular weight doubly bridged chromium phosphinate copolymer to the silicone fluid.

It has now been found in accordance with this invention that greases having unusually good properties, particularly with respect to drop point, are provided by compositions comprising a liquid lubricant and a small, but thickening amount of an inonganic polymer consisting of bridging groups and a triply bridged chromium atom where said bridging groups are the anions of phosphinic acids of structure $R_2P(X)XH$ wherein R is selected from the group consisting of alkyl and aryl and X is oxygen or sulfur.

The phoshinic acids preferred in the invention are those where R is an alkyl group of from one to eighteen carbon atoms and where R is an aryl group such as phenyl and naphthyl. It will be understood that the two R groups on the phosphinic acid need not be the same. It will also be understood that the X substituents on the phosphinic acid may be the same or different. The liquid lubricants which may be converted to greases in accordance with the invention include any of the numerous, well known lubricants such as hydrocarbon fluids, chlorinated polyphenyls, ester based fluids such as sebacates, adipates, azelates and the like, phosphate esters, silicone fluids, pentaerythritol esters, etc.

Two general methods of grease preparation may be followed and it will be understood that either one of the methods may be preferred with certain liquid lubricants. In both techniques a chromium containing inorganic doubly bridged polymer such as that disclosed in U.S. 3,275,574 where one unidentate ligand is water and a second unidentate ligand is the hydroxyl anion (i.e., a hydroxy-aquo polymer) is first mixed with the phosphinic acid $R_2P(X)XH$ in an organic solvent system such as hydrocarbons and halogenated hydrocarbons exemplified by benzene, chloroform, orthodichlorobenzene, toluene, solvents such as tetrahydrofuran, and the like. In one technique the solvent is removed to form a thickening composition which is simply added to the liquid lubricant and the mixture stirred with heating until grease consistency is obtained. In the second preparative technique the thickening composition is formed by allowing the hydroxy-aquo polymer-phosphinic acid-solvent system to form a gel by letting it stand at room temperature. Gel formation will generally occur in about 24 hours or more and in lesser time at elevated temperatures. The gel thus formed in the solvent system is then dispersed at room temperature in the fluid lubricant and the mixture heated (generally from about 100° C. to 225° C.) with stirring to evaporate any residual solvent, thereby leaving the grease product. In general, it may be said that when the phosphinic acid used contains R groups which contain four or more carbon atoms, the first method described above is preferred. Alternatively, when the phosphinic acid contains only aryl and/or lower alkyl groups then the second method is the preferred procedure. In both procedures the triply bridged inorganic polymer is formed in the final stages of the process. The hydroxy and water ligands which appear in the doubly bridged polymer from which the triply bridged polymer is obtained are removed as water during the processing steps and it is believed that their absence in the final grease product contributes to an improved grease. Thus, for example, the absence of any water eliminates any corrosion problems which a water containing grease might have. The ratio of phosphinic acid and chromium containing doubly bridged polymers which will be used in making the greases of the invention may vary considerably. In general the molar ratio of phosphinic acid to chromium in the polymer will be from about 0.4 to about 1.3. The preferred ratio range is from about 0.6 to about 1.1 and most preferably equimolar amounts will be employed.

The greases of the invention have excellent properties with respect to consistency, wear properties, and drop points, and lend themselves to easy handling. They show excellent drop points, being on the order of from 400° to 700° F. and they have excellent extreme pressure lubricity properties.

The chemical nature of the polymer comprised in the greases of the invention is characterized by being devoid of hydroxyl and water groups as stated above. The polymer is thus a triply bridged chromium containing polymer as described in copending S.N. 584,651, filed Oct. 6, 1966.

As stated above, the polymers are made in situ during the grease preparation. While it is not entirely understood exactly why or how grease formation occurs it is believed that the polymers, during their formation, form a matrix which envelops the liquid lubricant. In use, it is believed that the lubricant is released, but the polymeric matrix serves to hold grease consistency and maintain desirable lubricating properties. Based on infrared studies, it is believed that the first effect of reaction between the hydroxy-aquo polymer and the phosphinic acid is the displacement of the water ligand as the phosphinic acid coordinates with the polymer, and this reaction occurs at room temperature. Then, in the presence of the liquid lubricant, the final stages of the process involve removal of the hydroxyl anion ligand and the final triply bridged polymer is formed in situ. As indicated, this reaction mechanism is evidenced by infrared absorption studies on the intermediate products which show disappearance of the $H_2O$ band after the first reaction occurs. It will be understood, of course, that removal of all of the water and hydroxyl groups yields the preferred grease product, but greases will be formed even if all of these groups are not removed.

The amount of inorganic polymer which will be used with the liquid lubricant will be a thickening amount, the precise amount depending upon the desired final viscosity of the grease. In general, however, the amount of thickening agent will be on the order of 5% to 15% by weight of the liquid lubricant; depending upon the lubricant selected and the degree of viscosity desired. In order to further illustrate the invention the following examples are given, and in these examples several art accepted abbreviations are used in writing chemical formulae.

These abbreviations as used herein are:

Me for $CH_3$
Et for $C_2H_5$
Pr for $C_3H_7$
Bu for $C_4H_9$
Ph for $C_6H_5$

EXAMPLE I.—PREPARATION OF CHROMIUM METHYLPHENYLPHOSPHINATEDIOCTYL-PHOSPHINATE THICKENER (IA) A solution of 15.0 g. (38 millimoles) of $$Cr(H_2O)(OH)(OP(Me)(Ph)O)_2$$

polymer and of 10.95 g. (38 millimoles) of $$(C_8H_{17})_2P(O)OH$$

in 150 ml. of tetrahydrofuran (THF) is allowed to stand at room temperature for 30 minutes. The thickener product is then recovered by evaporation of the solvent.

(IB) A tetrahydrofuran solution is prepared containing 3.0 g. (7.6 millimoles)

$$Cr(H_2O)(OH)(OP(Me)(Ph)O)_2$$

polymer and 1.65 g. (5.7 millimoles) $(C_8H_{17})_2P(O)OH$. The solution it refluxed for 2½ hrs. and the thickener reaction product is recovered by evaporation of the solvent.

(IC) The polymer $Cr(H_2O)(OH)(OP(Me)(Ph)O)_2$ and the acid $(C_8H_{17})_2P(O)OH$ (1:1 molar ratio) are dissolved in benzene and the solution is heated at 60° C. for 3 hrs.

Grease preparation with thickener of Example I (1) Preparation of silicone fluid greases.—(a) An amount of 5 g. of the chromium phosphinate thickener, prepared as under (IA), is introduced into 45 ml. of a poly(methylphenylsiloxane) (Dow Corning 550 Lubricant). The mixture is heated to 140–160° C. and stirred vigorously. Grease formation is completed within 2 hours. To produce further setting of the grease it is heated an additional 5 hours at 170–180° C.

The grease has a dropping point of 340° C. and a penetration of 273 (ASTM D217–60T). Extreme pressure properties measured with a Shell Four Ball Tester show the following typical wear scar diameters:

40 kg. load—0.86 mm.
80 kg load—1.53 mm.
120 kg load—2.21 mm.
160 kg load—weld (b) A mixture of 0.2 g. of the thickener as prepared under IA and 1.8 ml. of poly(methylphenylsiloxane) liquid (Dow Corning 510 silicone fluid) is vigorously stirred and heated to 150° C. for 15.5 hrs. to give a soft grease.

(c) An amount of 0.2 g. thickener as prepared under (IA) is placed into 1.8 ml. poly(methylphenylsiloxane) fluid (Dow Corning 703 silicone fluid). The mixture is stirred and heated at 150° C. for 30 minutes at which time a firm, gel-like grease forms.

(d) Grease preparation with thickener B.—A grease is obtained from the thickener, prepared as described under (IB), by placing 0.5 g. into 4.5 ml. of Dow Corning 550 silicone fluid and heating with rapid stirring at 110° C. for 16 hours.

(e) Grease preparation with thickener C.—The benzene solution of the thickener described in (IC) is added to DC 550 lubricant to make a 4% by weight concentration of thickener. Subsequently more thickener solution is added until the final concentration is 10%. During the addition the mixture is heated to 150°–160° C. until all the solvent is flashed off thereby leaving a soft grease.

(2) Preparation of greases with ester fluids.—(a) To 45 ml. of a pentaerythritol ester (Hercolube A–P.E.) is added 4 g. of thickener, the preparation of which is described in Section (IA). The mixture is agitated at 100° C. for 15 minutes and then one additional gram of thickener is added. Stirring is continued for a period of 4 hours while the temperature is maintained at 125–130° C. to yield a smooth, homogeneous grease.

(b) An amount of 5 g. of thickener, prepared as described under (IA), is added to 45 ml. of di(2-ethylhexyl) sebacate. The reaction mixture is stirred and heated to 105–115° C. for 15.5 hours to yield a soft, homogeneous grease.

EXAMPLE II.—PREPARATION OF CHROMIUM METHYLPHENYLPHOSPHINATEDIBUTYL-PHOSPHINATE THICKENER (IIA) Amounts of 3.97 g. (10 millimole) of $$Cr(H_2O)(OH)(OP(Me)(Ph)O)_2$$

polymer and 1.78 g. (10 millimoles) of $(C_4H_9)_2P(O)OH$ are dissolved in 19 ml. benzene. The solution is kept at 60° C. for two days and the thickener product recovered by evaporation of the solvent.

(1) Preparation of a tricresyl phosphate grease.—A mixture of 0.2 g. of thickener of (IIA) and 2.3 ml. of tricresyl phosphate is stirred and heated at 130° C. for 4 hours to yield a soft grease.

(2) Preparation of a chlorinated polyphenyl grease.—An amount of 2.3 ml. of a chlorinated polyphenyl (Aroclor 1254, Monsanto Chemical Company) and 0.2 g. of thickener (IIA) are thoroughly mixed. The reaction mixture is heated to 150° C. for 3 hours while stirring is maintained thereby yielding a firm, smooth grease.

EXAMPLE III.—PREPARATION OF CHROMIUM METHYLPHENYLPHOSPHINATEDIHEXYL-PHOSPHINATE THICKENER (IIIA) A solution of 8.0 g. (20.2 millimole)

$$Cr(H_2O)(OH)(OP(Me)(Ph)O)_2$$

polymer and 4.72 g. (20.2 millimole) $(C_6H_{13})_2P(O)OH$ in 100 ml. tetrahydrofuran is heated to reflux for 2 hours. The solvent is then evaporated and the thickener product recovered.

(1) Preparation of a silicone grease.—About 4.5 g. of thickener prepared as described in Section (IIIA) is placed into 45 ml. of silicone fluid (Dow Corning 550 fluid). The mixture is vigorously stirred and heated at 130–160° C. for 4 hours. The resultant grease is further heat treated at 210° C. for 45 minutes. The drop point of this grease is in excess of 260° C.

EXAMPLE IV.—PREPARATION OF CHROMIUM METHYLPHENYLPHOSPHINATE-BIS(DECYL) PHOSPHINATE THICKENER (IVA) A solution of 3 g. (7.6 millimole) of $$Cr(H_2O)(OH)(OP(Me)(Ph)O)_2$$

polymer and 2.6 g. (7.5 millimole) of $(C_{10}H_{21})_2P(O)OH$ in 20 ml. THF is refluxed for two hours. The thickener product is recovered upon evaporation of the solvent.

(1) Preparation of a silicone fluid grease.—A vigorously stirred mixture of 0.5 g. of the thickener, prepared as described in (IVA) and 4.5 ml. of Dow Corning 550 fluid is heated to 150° C. for two hours. The resultant grease has a drop point in excess of 260° C.

(2) Preparation of a triaryl phosphate grease.—A mixture of 0.2 g. of thickener, prepared as described under (IVA), and of 2.3 ml. of a triaryl phosphate (Cellulube 550, Stauffer Chemical Company) is vigorously stirred and heated at 150° C. for 2 hours. A soft grease begins to form after one half hour.

(3) Preparation of a hydrocarbon grease.—To 4.5 ml. of a dewaxed refined mineral oil (Eureka Q, Atlantic Richfield Company) is added 0.5 g. of thickener, prepared as described under (IVA). The mixture is stirred and heated at 150° C. for 3.5 hours to yield an excellent grease.

EXAMPLE V.—PREPARATION OF CHROMIUM METHYLPHENYLPHOSPHINATE - BIS(TETRA-DECYL)PHOSPHINATE THICKENER (VA) About 1.6 g. (4 millimole) of

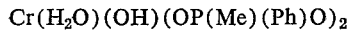

polymer and 1.84 g. (4 millimole) of $(C_{14}H_{29})_2P(O)OH$ are carefully ground in a mortar until a uniform mixture is obtained.

(1) Preparation of hydrocarbon grease.—An amount of 0.5 g. of the mixture, as prepared under (VA), is added to 4.5 ml. of a dewaxed refined mineral oil (Eureka F, Atlantic Richfield Company). The reaction mixture is vigorously stirred and heated to 150° C. under nitrogen until it thickens to a grease.

(2) Preparation of a chlorinated polyphenyl grease.— A mixture was prepared consisting of 0.3 g. of thickener, prepared as described under (VA), and of 4.6 ml. of a chlorinated polyphenyl (Aroclor 1254, Monsanto Chemical Company). The reaction mixture is heated at 150° C. for 3 hours during which time it thickens to a soft, gel-like grease.

EXAMPLE VI.—PREPARATION OF CHROMIUM DIBUTYLPHOSPHINATE-DIOCTYLPHOSPINATE THICKENER (VIA) A solution of 4.2 g. (9.5 millimole) of $Cr(H_2O)(OH)(OPBu_2O)_2$ polymer and 12.8 g. (9.5 millimole) of $C_8H_{17})_2P(O)OH$ is kept at reflux in 50 ml. of chloroform for about thirty minutes. The thickener product is then recovered by evaporation of the solvent.

(1) Preparation of a silicone grease.—An amount of 3.5 g. of thickener, prepared as described under (VIA), is introduced into 45 ml. of poly(methylphenylsiloxane) fluid (Dow Corning 550). The mixture is vigorously stirred and kept at 120–125° C. for about two hours until a smooth grease forms.

EXAMPLE VII.—PREPARATION OF CHROMIUM METHYLPHENYLPHOSPHINATE - DIHEXYL-PHOSPHINATE - DIPHENYLDITHIOPHOSPHI-NATE THICKENER (VIIA) A solution is prepared consisting of 10 g. (25.2 millimole) of $Cr(H_2O)(OH)(OP(Me)(Ph)O)_2$ polymer, 5.3 g. (22.6 millimole) of $(C_6H_{13})_2P(O)OH$ and 0.63 g. (2.5 millimole) of $Ph_2P(S)SH$ in 150 ml. of tetrahydrofuran. The solution is kept at reflux temperature for two hours and the solvent is then removed by evaporation. The residue is ground to a fine powder to produce the thickener product.

(1) Preparation of a silicone grease.—A mixture consisting of 4 g. of the thickener, prepared as described under (VIA), and 45 ml. of a poly(methylphenylsiloxane) (Dow Corning 550 fluid) is stirred and heated at 80–85° C. for one hour, and at 155–160° C. for one additional hour. A smooth, homogeneous grease results that possesses good extreme pressure characteristics.

EXAMPLE VIII.—PREPARATION OF CHROMIUM METHYLPHENYLPHOSPHINATE - DIOCTYL-PHOSPHINATE - METHYLPHENYLDITHIOPHOS-PHINATE THICKENER (VIIIA) This thickener is prepared by reacting a polymer characterized as $Cr(H_2O)(OH)(OP(Me)(Ph)O)_2$ with $(C_8H_{17})_2P(O)OH$ and $Me(Ph)P(S)SH$. The reaction is carried out in tetrahydrofuran by refluxing for one hour. The thickener is recovered by evaporating the solvent.

(1) Preparation of a pentaerythritol ester grease.— An amount of 4 g. of thickener, prepared as described in Section VIIIA is added to about 45 ml. of a pentaerythritol ester (Hercolube A-P.E. from the Hercules Company). The mixture is heated at 100–110° C. for 3 hours while vigorous stirring is maintained to form a smooth, homogeneous grease.

EXAMPLE IX.—PREPARATION OF CHROMIUM TRIS(METHYLPHENYLPHOSPHINATE THICK-ENER (IXA) To a solution of 20 g. (50.3 millimole) of

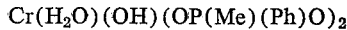

in 200 ml. of chloroform is added 7.86 g. (50.3 millimole) of $Me(Ph)P(O)OH$. After the solution is stirred for 3 hours at room temperature, the solvent is evaporated and the product ground to a powder. A 5 g. portion is then redissolved in 20 ml. of a solvent mixture consisting of 2 parts chloroform and 1 part dioxane. The solution is allowed to stand at room temperature for about one week until a firm gel forms.

(1) Preparation of silicone fluid grease.—A gel containing 5 g. of thickener, prepared as described under (IXA) is placed into 40 ml. of a poly(methylphenylsiloxane) fluid (Dow Corning 550 lubricant). The siloxane is vigorously agitated until the solvent evaporates and the thickener is thoroughly dispersed throughout the lubricant. Any residual solvent is removed from the grease by heating at 170° C. for several hours. The grease has a drop point in excess of 260° C.

(2) Preparation of a di(2-ethylhexyl) sebacate grease.—A gel containing 5 g. of thickener, prepared as described under (IXA) is placed into 50 ml. of di(2-ethylhexyl) sebacate lubricant. The mixture thickens to a grease after vigorous agitation and evaporation of solvents. Any residual solvent is removed by heating the grease to 100° C. for about 1 hour.

EXAMPLE X.—PREPARATION OF CHROMIUM DIPHENYLPHOSPHINATE-DIMETHYLPHOSPHI-NATE THICKENER (XA) A mixture of 1.6 g. (3.1 millimole) of

polymer and 0.288 g. (3.1 millimole) of $Me_2P(O)OH$ is dissolved in 16 ml. of chloroform and allowed to stand at 45° C. until a clear firm gel forms.

(1) Preparation of a silicone grease.—The gel containing the thickener prepared as described under section (XA) is dispersed in 35 ml. of a poly(methylphenylsiloxane) (Dow Corning DC 550 lubricant) by means of vigorous agitation. Residual solvent is removed from the grease by heating at 170° C. for about 3 hours. The resultant grease has a drop point in excess of 260° C.

We claim:

1. Grease compositions comprising a liquid lubricant thickened with an inorganic polymer consisting of a triply bridged chromium atom where said bridging groups are the anion of a phosphinic acid of structure $R_2P(X)XH$ wherein R is selected from the group consisting of alkyl, phenyl, and naphthyl and X is oxygen or sulfur.

2. A grease composition as in claim 1 where the liquid lubricant is a silicone fluid and it is thickened with chromium methylphenylphosphinate dioctylphosphinate.

3. A grease composition as in claim 1 where the liquid lubricant is a silicone fluid and it is thickened with chromium tris(methylphenylphosphinate).

4. A grease composition as in claim 1 where the liquid lubricant is diethylhexyl sebacate and is thickened with chromium methylphenylphosphinate dioctylphosphinate.

5. A grease composition as in claim 1 where the liquid lubricant is a hydrocarbon and it is thickened with chromium methylphenylphosphinate bis(decyl)phosphinate.

6. A grease composition as in claim 1 where the liquid lubricant is a silicone and it is thickened with chromium diphenylphosphinate dimethylphosphinate.

7. A grease composition as in claim 1 where the liquid lubricant is a silicone and it is thickened with chromium methylphenylphosphinate dihexylphosphinate.

8. The process of preparing a grease as in claim 1 which comprises the steps of (a) mixing in an organic solvent system a phosphinic acid of structure $R_2P(X)XH$, where R is alkyl, phenyl, and naphthyl and X is oxygen or sulfur, with a chromium containing inorganic doubly bridged polymer containing a water molecule and a hydroxyl anion as unidentate ligands, whereby a preliminary reaction occurs, (b) adding the reaction product of step (a) to a lubricating liquid, and (c) heating to a temperature of at least about 100° C. with stirring until a grease product is formed.

9. The process of claim 8 where (a) the phosphinic acid is dioctylphosphinic acid and the polymer is chromium methylphenylphosphinate, and (b) the lubricating fluid is a silicone.

10. The process of claim 8 where (a) the phosphinic acid is methylphenylphosphinic acid and the polymer is chromium methylphenylphosphinate, and (b) the lubricating fluid is a silicone.

11. The process of claim 8 where (a) the phosphinic acid is dioctylphosphinic acid and the polymer is chromium methylphenylphosphinate, and (b) the liquid lubricant is diethylhexyl sebacate.

12. The process of claim 8 where (a) the phosphinic acid is bis(decyl)phosphinic acid and the polymer is chromium methylphenylphosphinate, and (b) the lubricating liquid is a hydrocarbon.

13. The process of claim 8 where (a) the phosphinic acid is dimethylphosphinic acid and the polymer is chromium diphenylphosphinate, and (b) the liquid lubricant is a silicone.

14. The process of claim 8 where (a) the phosphinic acid is dihexylphosphinic acid and the polymer is chromium methylphenylphosphinate, and (b) the liquid lubricant is a silicone.

15. The process of claim 8 wherein the solvent of step (a) is removed and the resultant thickener added to said lubricating liquid.

16. The process of claim 8 wherein the solvent system of step (a) is allowed to form a gel and the gel added to said lubricating liquid.

References Cited

UNITED STATES PATENTS

| | | | |
|---|---|---|---|
| 3,331,774 | 7/1967 | Saraceno | 252—32.5 |
| 3,331,775 | 7/1967 | Saraceno | 252—32.5 |
| 3,332,873 | 7/1967 | Saraceno | 252—32.5 |

DANIEL E. WYMAN, Primary Examiner

I. VAUGHN, Assistant Examiner

U.S. Cl. X.R.

252—32.7, 49.6, 56